United States Patent
Longdon

(10) Patent No.: US 12,192,756 B2
(45) Date of Patent: Jan. 7, 2025

(54) LAYER-2 GROUPING OF ELECTRONIC DEVICES ACROSS HETEROGENEOUS NETWORKS

(71) Applicant: Ruckus IP Holdings LLC, Claremont, NC (US)

(72) Inventor: James Brook Longdon, Bothell, WA (US)

(73) Assignee: Ruckus IP Holdings, LLC, Claremont, NC (US)

( * ) Notice: Subject to any disclaimer, the term of this patent is extended or adjusted under 35 U.S.C. 154(b) by 403 days.

(21) Appl. No.: 17/690,112

(22) Filed: Mar. 9, 2022

(65) Prior Publication Data
US 2022/0201469 A1     Jun. 23, 2022

Related U.S. Application Data

(63) Continuation-in-part of application No. 17/355,337, filed on Jun. 23, 2021, which is a continuation of
(Continued)

(51) Int. Cl.
*H04W 12/02* (2009.01)
*H04L 9/40* (2022.01)
(Continued)

(52) U.S. Cl.
CPC ......... *H04W 12/02* (2013.01); *H04L 12/4641* (2013.01); *H04L 41/5054* (2013.01);
(Continued)

(58) Field of Classification Search
CPC ..... H04W 12/02; H04W 12/06; H04W 12/08; H04W 84/12; H04W 92/02;
(Continued)

(56) References Cited

U.S. PATENT DOCUMENTS

| | | |
|---|---|---|
| 8,412,942 B2 | 4/2013 | Bestermann |
| 9,025,533 B1 | 5/2015 | Lok et al. |

(Continued)

FOREIGN PATENT DOCUMENTS

EP    4333543 A1 *   3/2024   ........ H04W 28/0221

OTHER PUBLICATIONS

PCT International Search Report and Written Opinion, RE: Application No. PCT/US2019/017732, dated Apr. 15, 2019.
(Continued)

*Primary Examiner* — Melvin C Marcelo
(74) *Attorney, Agent, or Firm* — Steven Stupp

(57) ABSTRACT

A computer that segments traffic associated with different entities across heterogeneous networks is described. During operation, the computer may provide, addressed to a second computer, information that specifies a mapping of an identifier of an electronic device in a wireless network and a second identifier of a virtual container for traffic associated with the electronic device in the wireless network to a third identifier of the electronic device in a cellular-telephone network, where the electronic device and the virtual container are associated with an entity. Then, the computer may communicate the traffic between the wireless network and the cellular-telephone network within the virtual container based at least in part on the mapping, where the virtual container isolates the traffic from other traffic in the wireless network. Note that the identifier may include a MAC address and the third identifier may include an IMSI.

20 Claims, 13 Drawing Sheets

Related U.S. Application Data application No. 15/903,120, filed on Feb. 23, 2018, now Pat. No. 11,064,354.

(51) Int. Cl.

| | | |
|---|---|---|
| *H04L 12/46* | (2006.01) | |
| *H04L 41/5054* | (2022.01) | |
| *H04L 61/2539* | (2022.01) | |
| *H04L 61/4541* | (2022.01) | |
| *H04W 12/06* | (2021.01) | |
| *H04W 12/08* | (2021.01) | |
| *H04L 41/50* | (2022.01) | |
| *H04W 84/12* | (2009.01) | |
| *H04W 92/02* | (2009.01) | |

(52) U.S. Cl.
CPC ...... *H04L 61/2539* (2013.01); *H04L 61/4541* (2022.05); *H04L 63/0272* (2013.01); *H04L 63/0892* (2013.01); *H04L 63/104* (2013.01); *H04W 12/06* (2013.01); *H04W 12/08* (2013.01); *H04L 41/5077* (2013.01); *H04W 84/12* (2013.01); *H04W 92/02* (2013.01)

(58) Field of Classification Search
CPC ............. H04L 61/4541; H04L 61/2539; H04L 12/4641; H04L 41/5054; H04L 41/5077; H04L 63/0272; H04L 63/0892; H04L 63/104

See application file for complete search history.

(56) References Cited

U.S. PATENT DOCUMENTS

| | | |
|---|---|---|
| 9,288,645 B1 | 3/2016 | Chen et al. |
| 9,386,482 B1 | 7/2016 | Chen et al. |
| 9,467,831 B2 | 10/2016 | Chen et al. |
| 9,674,186 B2 | 6/2017 | Bestermann et al. |
| 2002/0145506 A1 | 10/2002 | Sato |
| 2013/0201978 A1 | 8/2013 | Iyer et al. |
| 2014/0192794 A1 | 7/2014 | Montemurro et al. |
| 2018/0041943 A1 | 2/2018 | Visuri et al. |
| 2018/0285373 A1 | 10/2018 | Dosovitsky et al. |
| 2018/0288179 A1 | 10/2018 | Bhatia et al. |
| 2018/0316563 A1 | 11/2018 | Kumar et al. |

OTHER PUBLICATIONS

Cisco, "MAC Authentication Bypass Deployment Guide," Document ID 1518931531672238, May 13, 2011, pp. 1-19.
"3rd Generation Partnership Project; Technical Specification Group Services and System Aspects; Procedures for the 5G System (5GS); Stage 2 (Release 17)", 3GPP Standard; 3GPP TS 23.502, 3rd Generation Partnership Project (3GPP), Mobile Competence Centre, 2021, 1-727.
"3rd Generation Partnership Project; Technical Specification Group Services and System Aspects; System architecture for the 5G System (5GS); Stage 2 (Release 17)", 3GPP Standard; 3GPP TS 23.501, 3rd Generation Partnership Project (3GPP), Mobile Competence Centre, 2021, 1-559.
"European Search Report in Corresponding Application No. 23160829.0, mailed Jun. 2, 2023, 13 pages".

* cited by examiner

FIG. 4

LAYER-2 GROUPING OF ELECTRONIC DEVICES ACROSS HETEROGENEOUS NETWORKS

CROSS-REFERENCE TO RELATED APPLICATION

This application is a Continuation-in-Part of U.S. Non-Provisional application Ser. No. 17/355,337, "Virtual Tenant for Multiple Dwelling Unit," filed on Jun. 23, 2021, by John Randolph Bestermann, et al., which is a Continuation of U.S. Non-Provisional application Ser. No. 15/903,120, "Virtual Tenant for Multiple Dwelling Unit," filed on Feb. 23, 2018, by John Randolph Bestermann, et al. (now U.S. Pat. No. 11,064,354), the contents of both of which are herein incorporated by reference.

FIELD

The described embodiments relate to techniques for grouping electronic devices across heterogeneous networks. Notably, the described embodiments relate to techniques for grouping electronic devices in virtual local area networks (VLANs) across heterogeneous networks in a private network environment using layer-2 information.

BACKGROUND

Many electronic devices are capable of wirelessly communicating with other electronic devices. Notably, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

Typically, infrastructure for a Wi-Fi, wireless and/or wired network may be owned and/or managed by a given entity or entities, such that the given entity or entities may make the network available for use by multiple other unrelated entities or third parties. Examples of such networks may be networks provided within hotels, apartment complexes, dormitory buildings, campuses, and other institutions (which are sometimes referred to as 'multiple dwelling unit' or MDU properties). More generally, these networks may also be provided in commercial (or corporate) or non-commercial environments (which are sometimes referred to as 'multi-user environments' or 'multi-entity environments').

Accordingly, various electronic devices of the unrelated entities, such as computers, lap tops, tablets, smartphones, printers, gaming devices, televisions, customer premises equipment, gateways, cable boxes, and the like of individuals, residents, students, employees or the like (which are sometimes referred to as 'tenants' or 'users'), may be configured to connect to the network via wireless communications or communications over wire connections to the network, e.g., to enable Internet connectivity. For purposes of privacy, each electronic device connecting to the shared network may be blocked from seeing the other electronic devices on the network. Thus, it is usually not possible for one electronic device connected to the network to communicate, share, pull, transfer, or perform any other task with another electronic device also connected to the network solely and directly by way of the network itself. This is true even if the electronic devices are commonly owned by the same entity.

By way of example, a school may offer a network to students for wireless and/or wired connections to the network, e.g., for purposes of connecting to the Internet or other source of information. An individual student may have multiple electronic devices connected to the network, such as a laptop computer and a wireless printer. Unfortunately, the printer would not be visible to the laptop, and thus, the student could not be able to send a file for printing to their printer directly by way of the network. Of course, if the student's printer was made visible to the student's laptop over the network, then the student would be able to communicate from the laptop to the printer. However, in this scenario, the student's laptop would also necessarily be able to see all other student's electronic devices and printers connected to the shared network, which is not desired from a privacy standpoint across a network being accessed by multiple unrelated tenants or users.

These challenges are increased when an entity supports multiple, heterogeneous networks. Notably, many entities (such as companies) are providing different wireless and wired networks in a private network environment. For example, a company may provide a Wi-Fi wireless network, a wired network and a cellular-telephone network at a location. Existing communication infrastructure supports seamless transitioning of packets or frames associated with an electronic device across heterogeneous networks. However, it remains difficult for an individual (such as a student) to communicate with their electronic devices in the heterogeneous networks while providing privacy by ensuring that the individual cannot see other individuals' electronic devices, and the other individuals' electronic devices cannot see the individual's electronic devices.

SUMMARY

A computer that segments traffic associated with different entities across heterogeneous networks is described. This computer may include an interface circuit that communicates with a second computer. During operation, the computer provides, addressed to the second computer, information that specifies a mapping of an identifier of an electronic device in a wireless network and a second identifier of a virtual container for traffic associated with the electronic device in the wireless network to a third identifier of the electronic device in a cellular-telephone network, where the electronic device and the virtual container are associated with an entity.

Then, the computer may communicate the traffic between the wireless network and the cellular-telephone network within the virtual container based at least in part on the mapping, where the virtual container isolates the traffic from other traffic in the wireless network. For example, when providing a packet addressed the second computer, the packet may include the identifier and the second identifier. Alternatively, when receiving a second packet associated with the second computer, the second packet may include the identifier and the second identifier. (Thus, the second computer may use the mapping to replace the identifier and the second identifier in the packet, or to include the identifier and the second identifier in the second packet.)

Note that the computer may be a gateway for the wireless network and/or the second computer may be a packet gateway for the cellular-telephone network. Alternatively, the computer may include a controller of computer network devices (such as access points, routers and/or switches) in the wireless network.

Moreover, the wireless network may be a wireless local area network (WLAN) that is compatible with an IEEE 802.11 communication protocol, and the cellular-telephone network may be compatible with a cellular data communication protocol.

Furthermore, the wireless network and the cellular-telephone network may be associated with a private entity.

Additionally, the identifier may include a media access control (MAC) address and the third identifier may include an international mobile subscriber identity (IMSI).

In some embodiments, the second computer may be associated with an evolved packet core (EPC) of the cellular-telephone network.

Moreover, the virtual container may include a VLAN.

Furthermore, the mapping may include layer 2 information.

Additionally, the information may specify the mapping of instances of the identifier and instances of the second identifier for a set of electronic devices to the third identifier, where the information permits intercommunication among the set of electronic devices in the wireless network and/or the cellular-telephone network.

In some embodiments, the computer may provide information specifying instances of the mapping for the multiple entities, where a given entity is associated with a given virtual container.

Another embodiment provides the second computer that performs counterparts to at least of the aforementioned operations in one or more of the preceding embodiments.

Another embodiment provides a computer-readable storage medium with program instructions for use with the computer or the second computer. When executed by the computer or the second computer, the program instructions cause the computer or the second computer to perform at least some of the aforementioned operations or counterparts to at least some of the aforementioned operations in one or more of the preceding embodiments.

Another embodiment provides a method, which may be performed by the computer or the second computer. This method includes at least some of the aforementioned operations or counterparts to at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 4 is a drawing illustrating an example of a user interface for specifying onboarding information in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
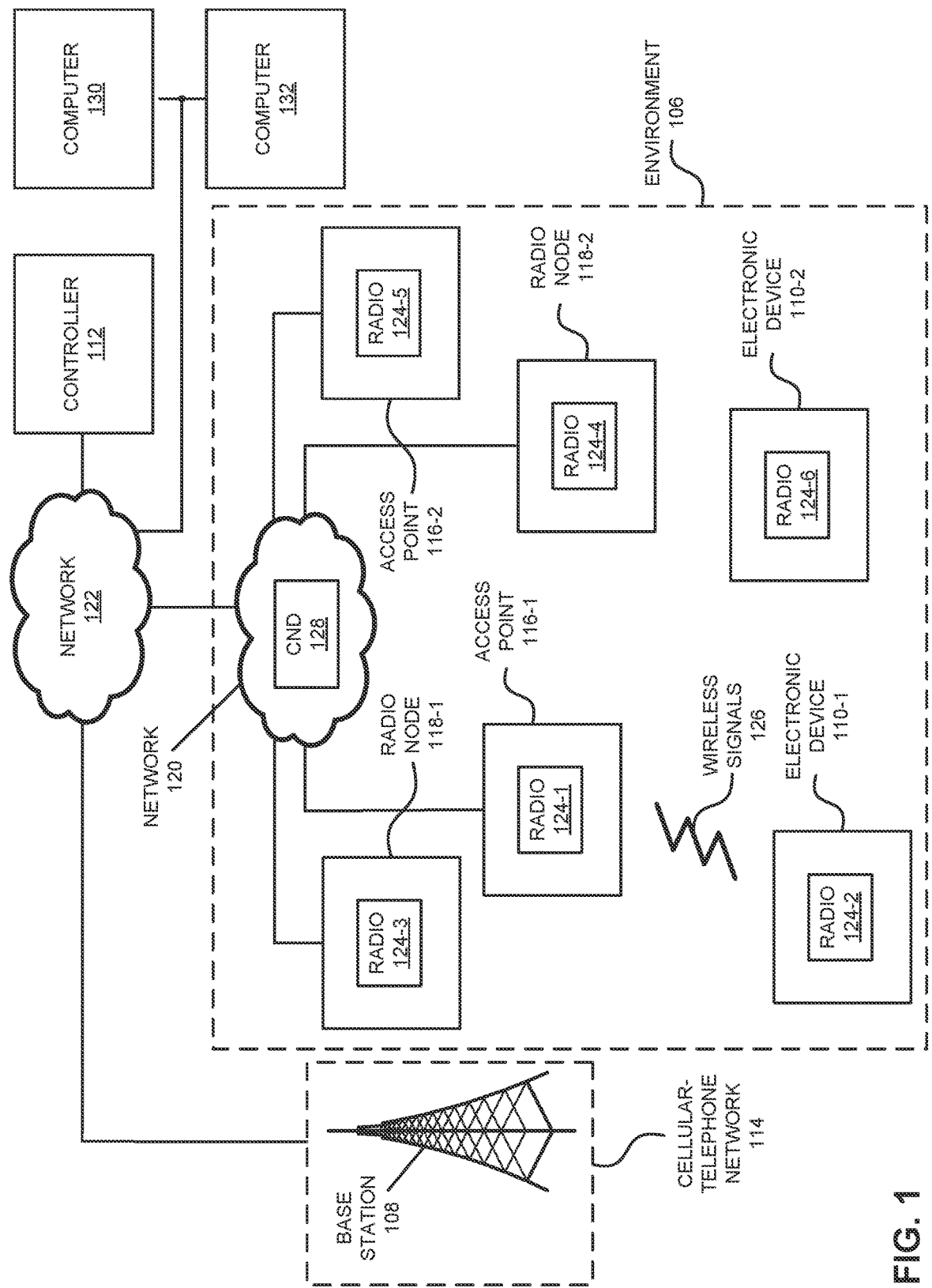
FIG. 1 is a block diagram illustrating an example of communication among electronic devices in accordance with an embodiment of the present disclosure.

A computer that segments traffic associated with different entities across heterogeneous networks is described. During operation, the computer may provide, addressed to a second computer, information that specifies a mapping of an identifier of an electronic device in a wireless network and a second identifier of a virtual container for traffic associated with the electronic device in the wireless network to a third identifier of the electronic device in a cellular-telephone network, where the electronic device and the virtual container are associated with an entity. Then, the computer may communicate the traffic between the wireless network and the cellular-telephone network within the virtual container based at least in part on the mapping, where the virtual container isolates the traffic from other traffic in the wireless network. Note that the identifier may include a MAC address and the third identifier may include an IMSI.

By providing the mapping information, these communication techniques may segment or isolate the traffic associated with different sets of electronic devices and/or different entities in the wireless network. Moreover, the communication techniques may provide communication continuity for the sets of electronic devices across heterogeneous networks while ensuring privacy within a given set of electronic devices. Consequently, the communication techniques may improve the user experience when using or managing the wireless network and/or the cellular-telephone network.

In the discussion that follows, the communication techniques are used with multiple tenants or groups of individuals (e.g., a person on the lease of an apartment, as well as their family members or friends who may share the apartment in an MDU environment), multiple entities or departments (e.g., multiple individuals in an enterprise, commercial or corporate environment of a company) or, more generally, multiple users.

Moreover, in the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth or Bluetooth low energy (BLE), an IEEE 802.15.4 standard (which is sometimes referred to as Zigbee), a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network and/or the cellular-telephone network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a public cellular-telephone network 114 or a public land mobile network or PLMN (which may include a base station 108), one or more access points 116 (which may communicate using Wi-Fi) in a WLAN and/or one or more radio nodes 118 (which may communicate using LTE, 5G, 6G, etc.) in another cellular-telephone network associated with a private entity (such as a small-scale network or a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'computer network device.' Moreover, one or more base stations (such as base station 108), access points 116, and/or radio nodes 118 may be included in one or more wireless networks, such as: a WLAN and/or a cellular-telephone network (such as a cellular-telephone network associated with a private entity). In some embodiments, access points 116 may include a physical access point and/or a virtual access point that is implemented in software in an environment of an electronic device or a computer.

Note that access points 116 and/or radio nodes 118 may communicate with each other and/or controller 112 (which may be a local or a cloud-based controller that manages and/or configures access points 116, radio nodes 118 and/or a computer network device (CND) 128, or that provides cloud-based storage and/or analytical services) using a wired communication protocol (such as Ethernet) via network 120 and/or 122. Alternatively or additionally, access points 116 and/or radio nodes 118 may communicate with each other using the wired communication protocol via gateways, such as computer 130 and computer 132 (e.g., computer 130 may be a gateway for the wireless network and/or computer 132 may be a packet gateway for the cellular-telephone network associated with the private entity, and more generally may be associated with an EPC of the cellular-telephone network). However, in some embodiments, access points 116 and/or radio nodes 118 may communicate with each other, controller 112, computer 130 and/or computer 132 using wireless communication (e.g., one of access points 116 may be a mesh access point in a mesh network). Note that networks 120 and 122 may be the same or different networks. For example, networks 120 and/or 122 may an LAN, an intra-net or the Internet. In some embodiments, network 120 may include one or more routers and/or switches (such as computer network device 128).

Figure 13:
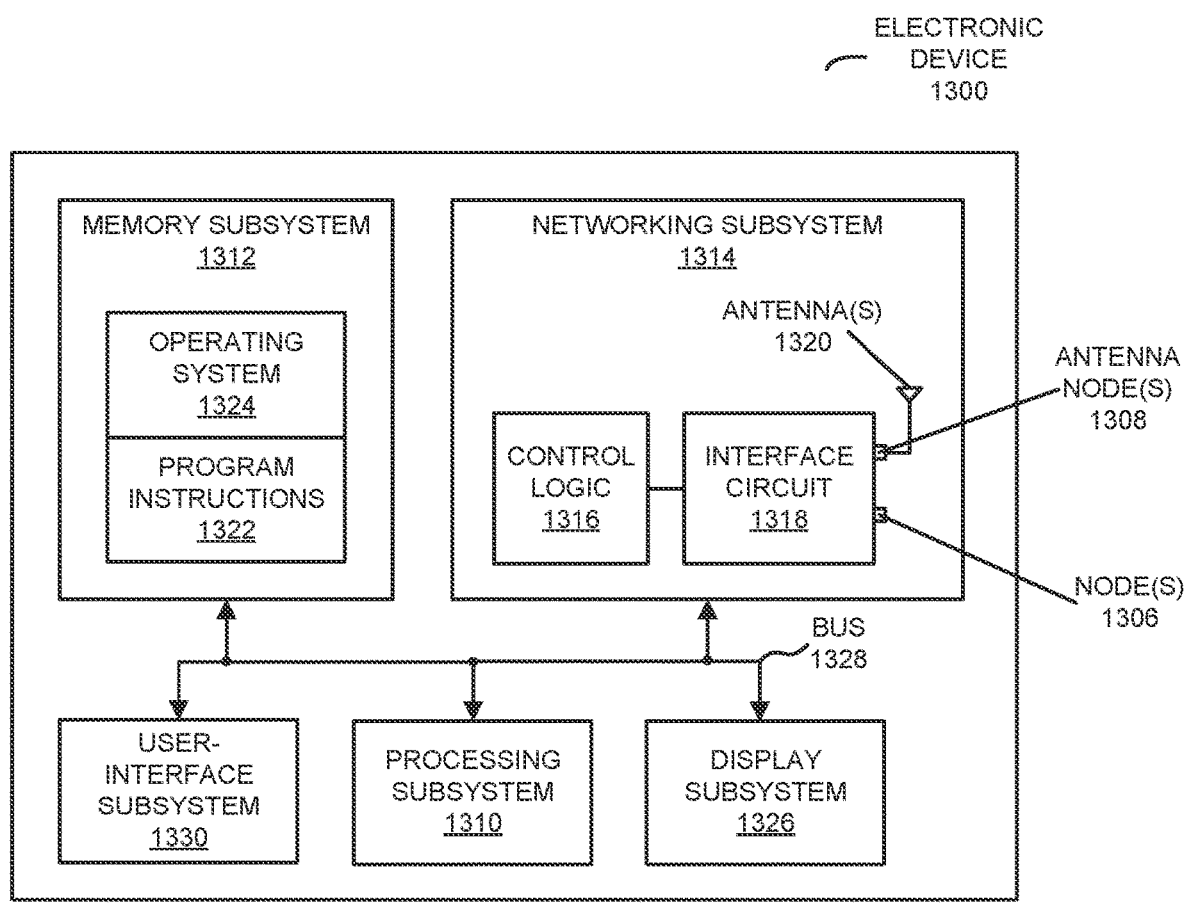
FIG. 13 is a block diagram illustrating an example of an electronic device in accordance with an embodiment of the present disclosure.

As described further below with reference to FIG. 13, electronic devices 110, controller 112, access points 116, radio nodes 118, computer network device 128, computer 130 and computer 132 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to communicate traffic among different sets of electronic devices in heterogeneous networks while ensuring privacy of different entities or users. Moreover, as discussed in FIGS. 2-12B, in order to address these problems computer 130 may provide information to computer 132 that facilitates segmentation or isolation of traffic (e.g., packets or frames) associated with different entities across heterogeneous networks (such as the wireless network and the cellular-telephone network associated with the private entity). Notably, computer 130 may provide, to computer 132, information that specifies a mapping of an identifier of an electronic device (such as electronic device 110-1) in a wireless network and a second identifier of a virtual container (such as a VLAN) for traffic associated with electronic device 110-1 in the wireless network to a third identifier of electronic device 110-1 in a cellular-telephone network, where electronic device 110-1 and the virtual container are associated with an entity. For example, the identifier may include a MAC address and the third identifier may include an IMSI. More generally, the mapping may include layer 2 information. In addition, more generally, the second identifier may include or may specify a policy or a quality of service (QoS) associated with the traffic in the heterogeneous networks.

Then, computer 130 may communicate the traffic between the wireless network and the cellular-telephone network within the virtual container based at least in part on the mapping, where the virtual container isolates the traffic from other traffic in the wireless network. For example, when providing a packet addressed computer 132, the packet may include the third identifier. Alternatively, when receiving a second packet associated with computer 132, the second packet may include the identifier and the second identifier. However, in other embodiments, when providing the packet addressed computer 132, the packet may include the identifier and the second identifier, and computer 132 may add the third identifier or may replace the identifier and the second identifier with the third identifier. Similarly, when receiving the second packet associated with computer 132, the second packet may include the third identifier, and computer 130 may add the identifier and the second identifier or may replace the third identifier with the identifier and the second identifier. Note that different components (such as one of access points 116 and/or one of radio nodes 118 may communicate the traffic between the wireless network and the cellular-telephone network within the virtual container based at least in part on the mapping.

For example, the virtual container may be provided using an IEEE 802.1x dynamic VLAN assignment feature. Notably, MAC authorization bypass (MAB) may be used to dynamically create a VLAN for an entity or a user that may be accessed across the wireless network via any of access points 116. Note that MAB is an access control technique that uses the MAC address of an electronic device (such as electronic device 110-1) to determine the extent of network access to provide to electronic device 110-1. Similarly, computer 132 may use the mapping to configure equipment or components in the cellular-telephone network to implement the mapping based at least in part on the MAC address of electronic device 110-1. Notably, computer 132 may provide the mapping to an EPC of the cellular-telephone network.

Because MAC address randomization may complicate the use of the communication techniques, in some embodiments: MAC address randomization may be disabled; an application executing on a given electronic device (such as electronic device 110-1) may, with user approval, provide the mapping information; and/or an electronic fingerprint or signature of the given electronic device (such as installed applications and/or a configuration of the given electronic device) may be determined and used instead of or in addition to the MAC address.

Additionally, in some embodiments the information may specify the mapping of instances of the identifier and instances of the second identifier for a set of electronic devices to the third identifier, where the virtual container permits intercommunication among the set of electronic devices in the wireless network and/or the cellular-telephone network. These capabilities may allow an entity or a user to communicate with other electronic devices in the set of electronic devices via the heterogeneous networks while maintain privacy.

In some embodiments, computer 130 may provide information specifying instances of the mapping for the multiple entities, where a given entity is associated with a given virtual container. Thus, multiple entities or users may have their own virtual containers in the wireless network.

In these ways, the communication techniques may segment or isolate the traffic associated with different sets of electronic devices and/or different entities in the wireless network and/or the cellular-telephone network associated with a private entity. These capabilities may provide communication continuity for electronic devices in the heterogeneous networks while ensuring privacy within a given set of electronic devices. Consequently, the communication techniques may improve the user experience when using or managing a wireless network (such as a WLAN) and/or a cellular-telephone network (such as a cellular-telephone network associated with a private entity).

While the preceding discussion illustrated the use of the invention with a wireless network and a cellular-telephone network associated with a private entity, in other embodiments the communication techniques may be used with a wide variety of different types of networks. For example, the communication techniques may provide segmenting or isolation of traffic based at least in part on layer 2 information (such as the mapping) between a WLAN and a public cellular-telephone network or a PLMN. Thus, the heterogeneous networks may be associated with the same or different providers, and/or may be public networks or private networks. In addition, while FIG. 1 illustrates the heterogeneous networks with the wireless network and the private cellular-telephone network (or a cellular-telephone network having an EPC associated with a private entity), in other embodiments the heterogeneous networks may include a wired network (such as a local area network).

Moreover, while FIG. 1 illustrates cloud-based computers 130 and 132, in other embodiments components in the communication techniques may be implemented locally and/or remotely from a property or a location operated by an entity or entities where the wireless network and the cellular-telephone network provide coverage or service. Furthermore, the communication techniques may be implemented in a centralized and/or a distributed manner. Thus, instead of computer 130 or 132, in other embodiments a computer system with multiple computers at one or more locations may be used.

Furthermore, while FIG. 1 illustrates controller 112 and computer 130 as separate components, in other embodiments these components may be combined into a single component. Thus, in some embodiments, computer 130 may be a controller.

Figure 2:
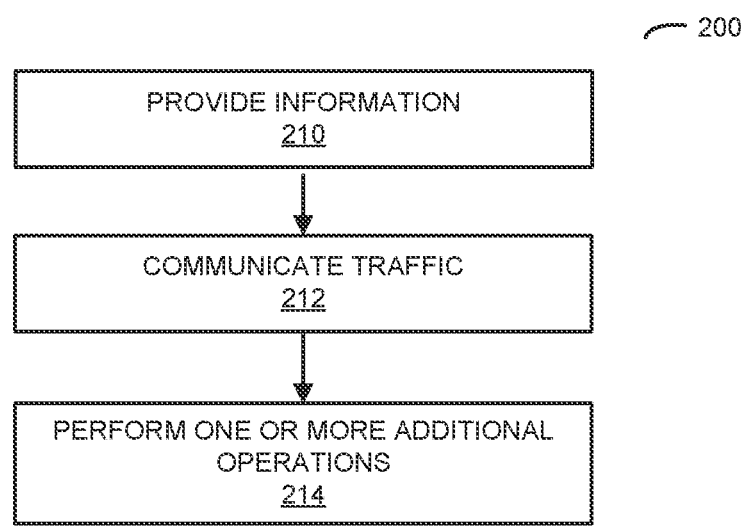
FIG. 2 is a flow diagram illustrating an example of a method for segmenting traffic associated with different entities across heterogeneous networks using a computer in FIG. 1 in accordance with an embodiment of the present disclosure.

We now describe embodiments of the method. FIG. 2 presents a flow diagram illustrating an example of a method 200 for segmenting traffic associated with different entities across heterogeneous networks, which may be performed by a computer (such as computer 130, one of access points 116 or one of radio nodes 118 in FIG. 1). During operation, the computer may provide, addressed to a second computer, information (operation 210) that specifies a mapping of an identifier of an electronic device in a wireless network and a second identifier of a virtual container (such as a VLAN) for traffic associated with the electronic device in the wireless network to a third identifier of the electronic device in a cellular-telephone network, where the electronic device and the virtual container are associated with an entity. Note that the identifier may include a MAC address and the third identifier may include an IMSI (or information associated with a telephone number). More generally, the identifier and the third identifier may include layer 2 information or data-link-layer information in an Open Systems Interconnection (OSI) model.

Then, the computer may communicate the traffic (operation 212) between the wireless network and the cellular-telephone network within the virtual container based at least in part on the mapping, where the virtual container isolates the traffic from other traffic in the wireless network. For example, when providing a packet addressed the second computer, the packet may include the identifier and the second identifier. Alternatively, when receiving a second packet associated with the second computer, the second packet may include the identifier and the second identifier. (Thus, the second computer may use the mapping to replace the identifier and the second identifier in the packet, or to include the identifier and the second identifier in the second packet.)

Note that the computer may be a gateway for the wireless network and/or the second computer may be a packet gateway for the cellular-telephone network. Alternatively, the computer may include a controller of computer network devices (such as access points, routers and/or switches) in the wireless network. Moreover, the wireless network may be a WLAN that is compatible with an IEEE 802.11 communication protocol, and/or the cellular-telephone network may be compatible with a cellular data communication protocol. Furthermore, the wireless network and the cellular-telephone network may be associated with a private entity. Additionally, the second computer may be associated with an EPC of the cellular-telephone network.

In some embodiments, the computer may optionally perform one or more additional operations (operation 216). For example, the information may specify the mapping of instances of the identifier and instances of the second identifier for a set of electronic devices to the third identifier, where the virtual container permits intercommunication among the set of electronic devices in the wireless network and/or the cellular-telephone network.

Moreover, the computer may provide information specifying instances of the mapping for the multiple entities, where a given entity is associated with a given virtual container.

Furthermore, the computer may optionally provide second information (such as an IEEE 802.1Q tag) to one or more computer network devices (such as one or more access points, one or more switches, one or more routers, etc.) in the wireless network. The second information may specify the identifier and the third identifier. Using the second information, the one or more computer network devices may segment or isolate the traffic associated with the electronic device in the virtual container in the wireless network. Notably, the one or more computer network devices may use the second information in MAB to dynamically create the virtual container, such as by adding the IEEE 802.1Q tag to packets associated with the electronic device.

In some embodiments of method 200, there may be additional or fewer operations. Furthermore, the order of the operations may be changed, and/or two or more operations may be combined into a single operation.

Figure 3:
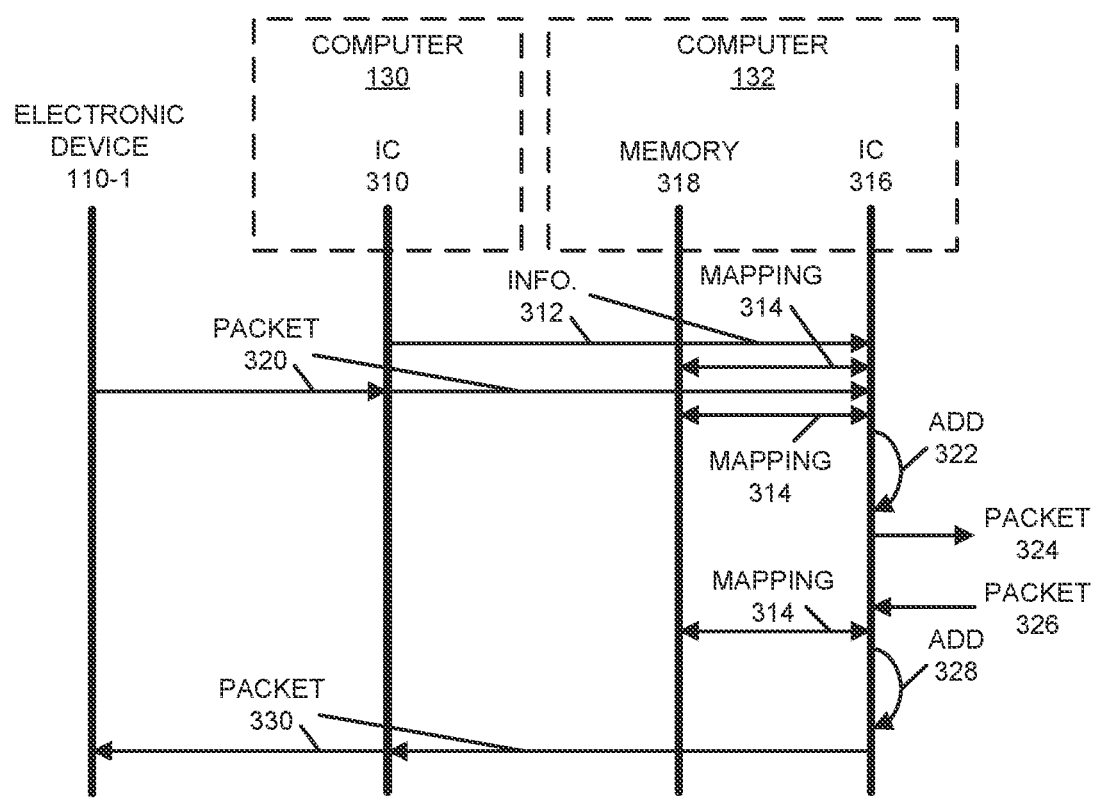
FIG. 3 is a drawing illustrating an example of communication between a computer and a second computer in FIG. 1 in accordance with an embodiment of the present disclosure.

Embodiments of the communication techniques are further illustrated in FIG. 3, which presents a drawing illustrating an example of communication between computer 130 and computer 132. In FIG. 3, an interface circuit 310 in computer 130 may provide, to computer 132, information 312 that specifies a mapping 314 of a MAC address of electronic device 110-1 in a WLAN and an identifier of a VLAN for traffic associated with electronic device 110-1 in the WLAN to an IMSI of electronic device 110-1 in a cellular-telephone network, where electronic device 110-1 and the VLAN are associated with an entity (such as an individual or a user). After receiving information 312, interface circuit 316 in computer 132 may store mapping 314 in memory 318 in computer 132.

Then, computers 130 and 132 may communicate traffic between the WLAN and the cellular-telephone network within the VLAN based at least in part on mapping 314, where the virtual container isolates the traffic from other traffic in the WLAN. For example, after receiving packet 320 from electronic device 110-1, interface circuit 310 may provide a packet 320 to computer 132 with the MAC address and the identifier of the VLAN. After receiving packet 320, interface circuit 316 may access mapping 314, and may look up the IMSI in mapping 314 based at least in part on the MAC address. Then, interface circuit 316 may add 322 or include the IMSI in packet 320, and may provide modified packet 324 to the cellular-telephone network.

Alternatively, after receiving packet 326 from the cellular-telephone network, interface circuit 316 may access mapping 314 in memory 318, and may provide a modified packet 330 to computer 130 based at least in part on mapping 314. Notably, interface circuit 316 may look up the MAC address in mapping 314 based at least in part on the IMSI, and then may add 328 or include the MAC address and the identifier of the VLAN to packet 326. Next, computer 130 may provide packet 330 to electronic device 110-1.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

Figure 4:
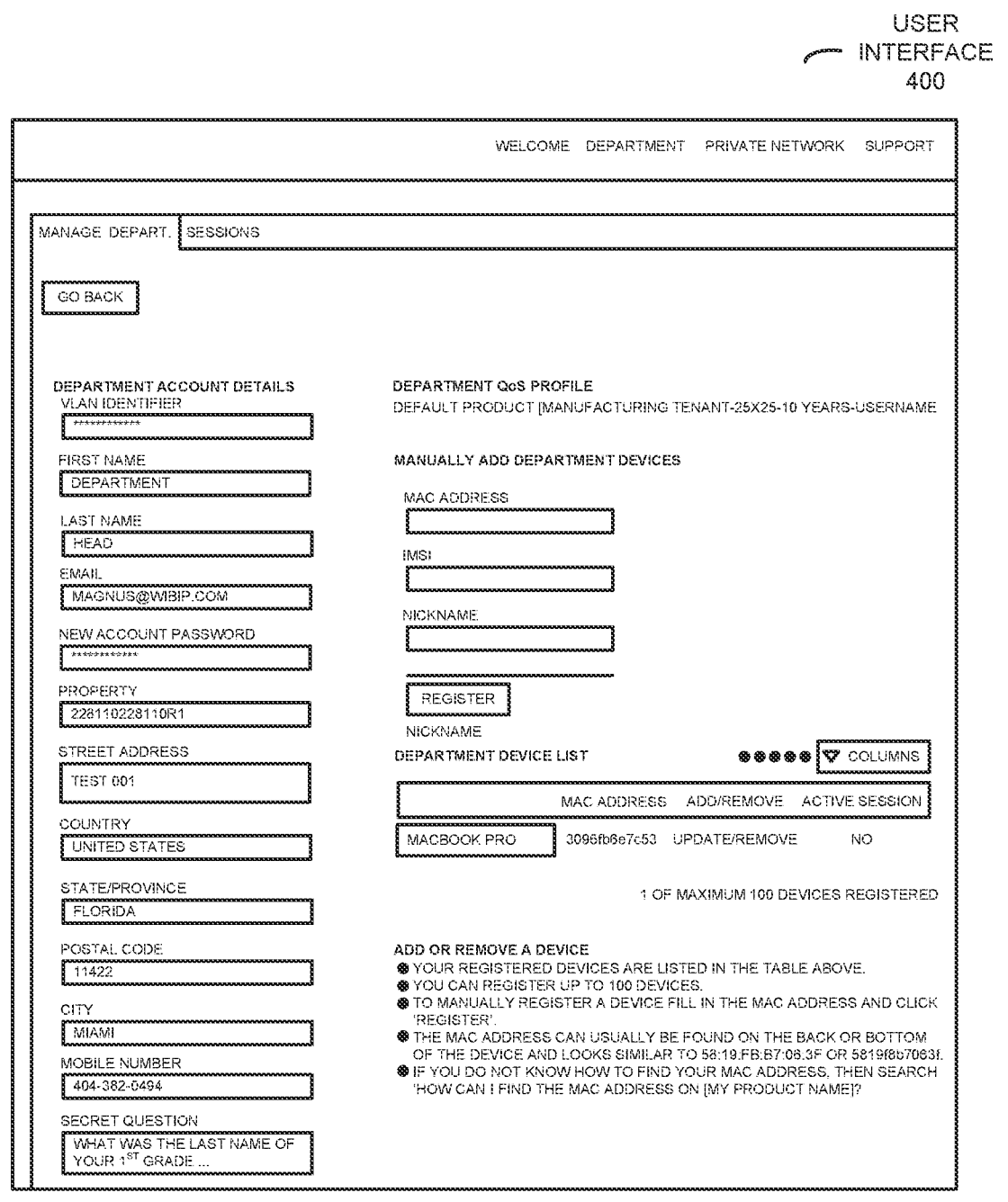

We now further describe the communication techniques. FIG. 4 presents a drawing illustrating an example of a user interface 400 for specifying onboarding information. Notably, using user interface 400, an entity, tenant or user may register one or more electronic devices in a set of electronic devices. For example, registering a given electronic device may include providing: a MAC address and an IMSI. Based at least in part on this registration information, the given electronic device may be associated with a unique virtual container (such as a VLAN) in heterogeneous networks.

Subsequently, when this entity, tenant or user connects to the WLAN (such as by associating or establishing a connection between the given electronic device with a wireless network having a service set identifier or SSID), IEEE 802.1x MAB authentication may assign traffic associated with the given electronic device to the virtual container. Notably, when the given electronic device authenticates access to the WLAN with an AAA server, the AAA server may identify the given electronic device based at least in part on the MAC address, and then may assign the given electronic device to the virtual container. Then, the AAA server may provide IEEE 802.1Q tag information to computer network devices in the WLAN. In addition, the information specifying the mapping may be provided to a packet gateway of a cellular-telephone network, so that traffic communicated between the WLAN and the cellular-telephone network may be segmented or isolated from other traffic across these heterogeneous networks. For example, the information specifying the mapping may be provided to the EPC of the cellular-telephone network.

Note that user interface 400 may be associated with a stand-alone application or may provided in a Web browser.

While the preceding discussion illustrated the use of user interface 400 to register the given electronic device, in other embodiments an application executing on the given electronic device (such as in an environment or operating system of the given electronic device) may automatically collect the MAC address and IMSI (e.g., from a subscriber identity module or SIM card, or an electronic SIM or eSIM, in the given electronic device), and then may automatically provide this information (e.g., to computer 130 in FIG. 1) to register the given electronic device.

Figure 5:
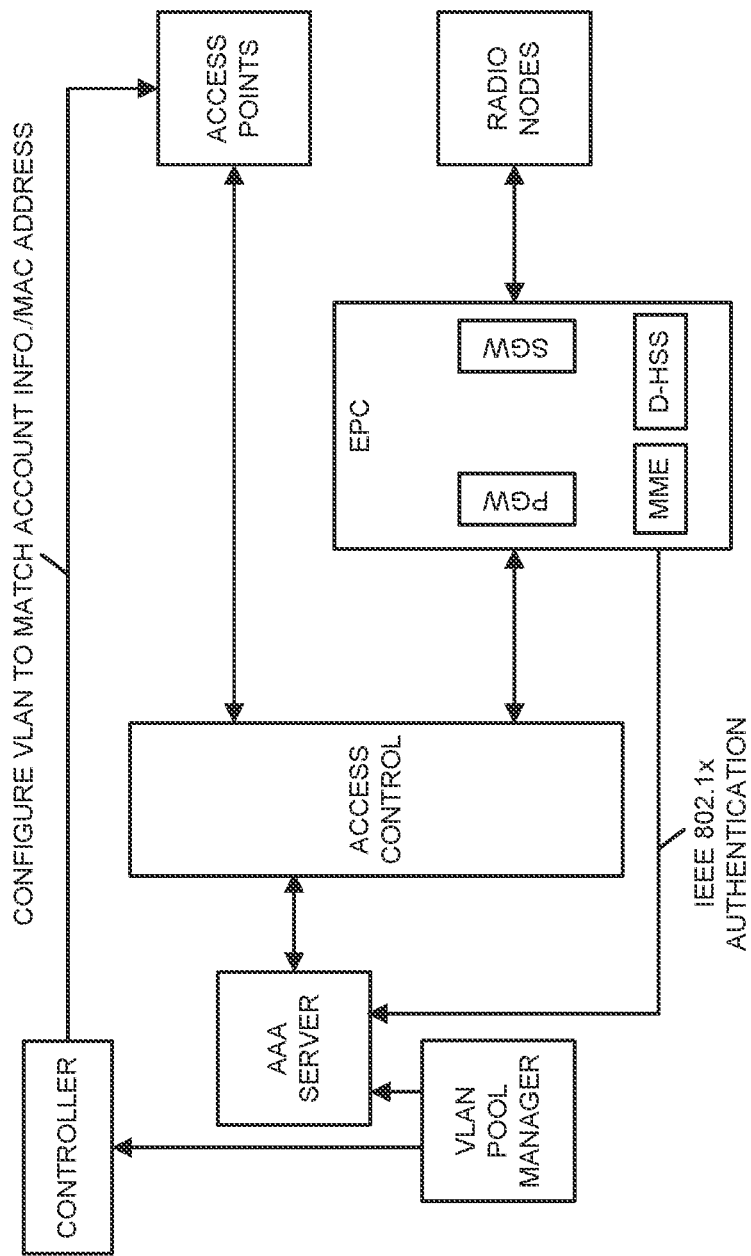
FIG. 5 is a block diagram illustrating an example of communication among electronic devices in accordance with an embodiment of the present disclosure.

FIG. 5 presents a block diagram illustrating an example of communication among electronic devices. Notably, FIG. 5 illustrates LAN roaming and dynamic VLAN assignment across heterogeneous networks, such as a WLAN and a cellular-telephone network (which may include a mobile management entity or MME, a packet gateway of PGW, a serving gateway or SGW and/or a distributed home subscriber server or D-HHS).

In some embodiments, the communication techniques may be used with an MDU network (which is used as an illustrative example of a type of network in the heterogenous networks used with the communication techniques, and more generally the communication techniques may be used with heterogeneous networks). Notably, a separate virtual network may be provided to each entity or individual across a wired and/or wireless MDU network on a MDU property having a managed Wi-Fi infrastructure, which is otherwise shared by multiple unrelated entities or individuals across the property. For example, in these embodiments, a managed network provided in an otherwise large-scale may appear to each individual user or tenant on the MDU property as a private or personal network, such as provided in a routed single-family home, private premises, or the like.

Moreover, the Wi-Fi infrastructure may use a single SSID across the property or multiple SSIDs. Note that an SSID is the name assigned to the managed Wi-Fi (wireless) network and provides an Internet Protocol (IP) address for the network. All electronic devices in the network may use this case-sensitive name, typically a text string up to 32 bytes long, to communicate over the Wi-Fi infrastructure. Thus, the client electronic devices of each tenant of the MDU property necessarily may use the same one or more SSIDs. It is possible that the MDU property may use an additional SSID for guests of the premises or that a resident on the property may have their own private network via their own private infrastructure.

Furthermore, each tenant on the MDU property may be provided with a 'personal network' (PN) (such as a VLAN) to which their wired and wireless electronic devices, and only their wired and wireless electronic devices, can intercommunicate throughout the MDU property independent of a physical connection or network access point. Thus, e.g., a tenant may have multiple electronic devices that connect to the MDU network and that are able to see and intercommunicate with each other. For example, a laptop of the tenant connected to the PN may be able to see their printer connected to the PN and send a file to the printer over the MDU network for printing. However, the electronic devices and PN of the tenant may be hidden and private relative to all other tenants on the property that may use the shared MDU network. In addition, the tenant can connect to their other electronic devices and gain access to their PN anywhere on the defined MDU property at any access or connection point or infrastructure.

Figure 6:
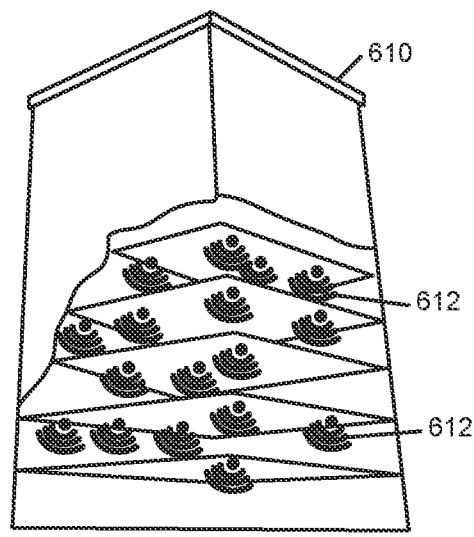
FIG. 6 is a drawing illustrating an example of a multiple dwelling unit (MDU) property having MDU network infrastructure in accordance with an embodiment of the present disclosure.
Figure 7:
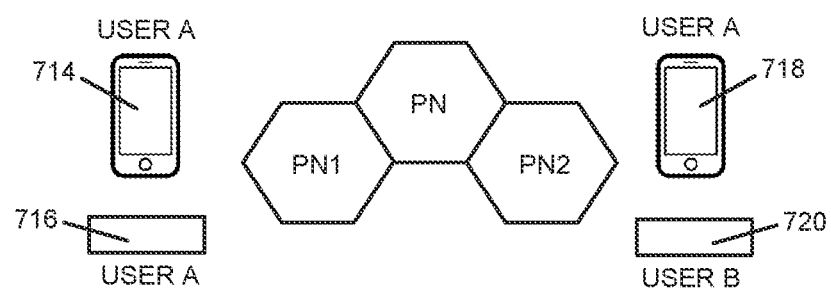
FIG. 7 is a drawing illustrating an example of client electronic devices of two tenants of a MDU property and associated personal networks in accordance with an embodiment of the present disclosure.

FIG. 6 presents a drawing illustrating an example of a MDU property 610 having MDU network infrastructure. For example, MDU property 610 may include an apartment building, and numerous access or connection points 612 located throughout the MDU property 610 and forming part of a managed Wi-Fi infrastructure. FIG. 7 presents a drawing illustrating an example of client electronic devices of two tenants of a MDU property and associated PNs. Notably, FIG. 7 shows electronic devices 714 and 716 of user A and electronic devices 718 and 720 of user B. User A may be assigned one of the PNs (PN1) shown schematically in FIG. 2 and user B may be assigned a different one of the PNs (PN2) shown schematically in FIG. 2. Thus, electronic devices 714 and 716 can see and communicate with each other on PN1 and are isolated and hidden from electronic devices 718 and 720.

Additionally, the PNs may be provided using an IEEE 802.1x dynamic VLAN assignment feature provided by equipment configuring the infrastructure, such as switching routers (ISRs), with MAC authorization bypass to dynamically create a PN for a tenant that may be accessed across the MDU property via any access point. As noted previously, MAB is an access control technique that uses the MAC address of an electronic device to determine the extent of network access to provide to the electronic device. Accordingly, a tenant may register their electronic devices, which are then assigned to a unique VLAN, thereby providing a PN to the tenant and their electronic devices. Thus, a known tenant or user may connect to the SSID, and IEEE 802.1x MAB authentication may permit boarding of the electronic device of the tenant on the assigned VLAN.

Figure 8:
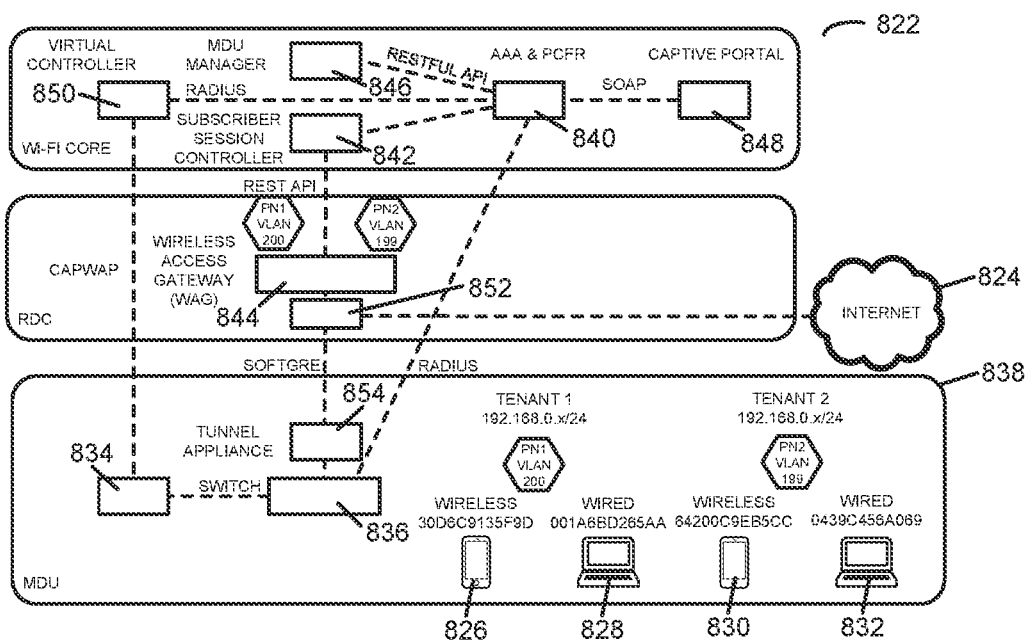
FIG. 8 is a drawing illustrating an example of a system architecture of infrastructure of an MDU property in accordance with an embodiment of the present disclosure.

FIG. 8 presents a drawing illustrating an example of a system architecture 822 of infrastructure of an MDU property. This system architecture may provide different VLANs to different tenants and may enable the tenants to access the Internet 824 or another network or source. In these embodiments, tenant 1 may have two electronic devices, 826 (a wireless electronic device) and 828 (a wired electronic device), assigned a PN (PN1), e.g., VLAN 200 on SSID 192.1680x/24, and tenant 2 may have two electronic devices, 830 (a wireless electronic device) and 832 (a wired electronic device), assigned a PN (PN2), e.g., VLAN 199 on SSID 192.1680x/24. These electronic devices may connect to a PN on the MDU network via wireless or wired connections. For example, the electronic devices may connect to a PN via access point (AP) 834 of the managed infrastructure and associated switch 836, located on MDU property 838.

During MDU network creation for an MDU property, a captive portal and property identifier may be created by an authentication, authorization, and accounting (AAA) and/or policy control management (PCRF) unit 840 and a captive portal 848 for MDU property 838. In a subscriber session controller (SSC) 842 and wireless access gateway (WAG) infrastructure 844 (which may include tunnel appliances 854), a relationship may be created that builds the property identifier. As discussed below in greater detail, an MDU manager 846 may programmatically provision SSC 842 using a restful application programming interface (API) that uses HTTP requests to get, put, post or delete data. Note that MDU manager 846 may also be used to assign VLANs/PNs to the tenants.

Moreover, Wi-Fi controller 850 may communicate with access points 834 via control and provisioning of wireless access points (CAPWAP), and a remote authentication dial-in user service (RADIUS) may be used by AAA unit 840. Note that RADIUS is a networking protocol that provides centralized authentication, authorization, and accounting management for users who connect and use a network service. Furthermore, a router 852 may provide a connection from the MDU network to the Internet 824 or another network or source.

During individual tenant account creation according to some embodiments, a VLAN may be assigned to a tenant's account via MDU manager 846. The tenant's account may be keyed to an email address, username, or the like. The tenant's electronic devices may be on-boarded to the tenant's account via a tenant portal for use by the tenant or MDU manager 846. Thus, when a client electronic device has been added to an existing tenant's account, the Wi-Fi infrastructure may automatically provide access to the tenant's PN and other electronic devices registered in the tenant's account.

In contrast, when an unknown client electronic device attempts to connect to the MDU network via the infrastructure, the unknown electronic device may be assigned to a specific onboarding VLAN by MDU manager 846. On the onboarding VLAN, the unknown electronic device may be redirected to an appropriate tenant portal for account creation and/or electronic device onboarding. After onboarding, the registered electronic device may be moved to the VLAN assigned to the tenant.

In some embodiments, dynamic VLAN assignment may be accomplished via MDU manager 846 which provides the functions of managing and reserving VLANs and associated assignments on the MDU property. The AAA and PCRF unit 840 may request a VLAN for a tenant from MDU manager 846, and MDU manager 846 may mark the VLAN assigned as used and associated with the tenant master account. Note that MDU manager 846 may also free VLANs when a tenant account is deleted.

Figure 9:
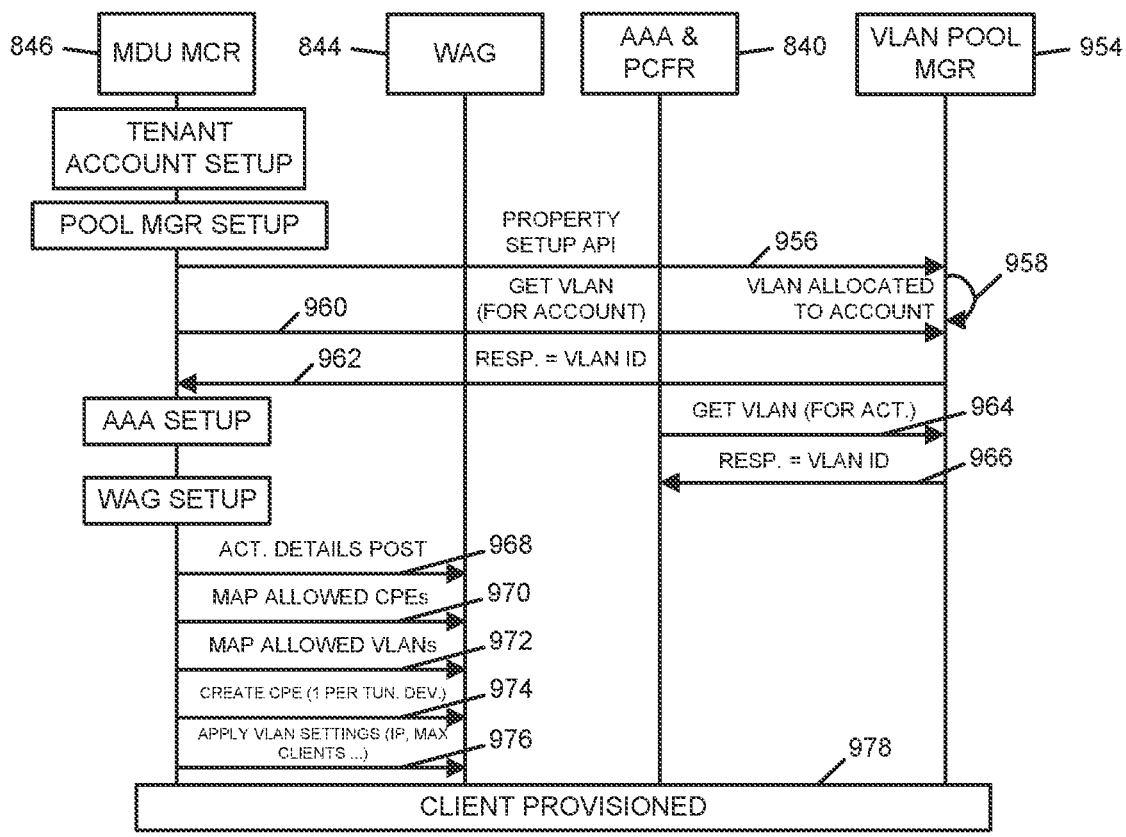
FIG. 9 is a flow diagram illustrating an example of a provisioning and virtual local area network (VLAN) management call flow in accordance with an embodiment of the present disclosure.

FIG. 9 presents a flow diagram illustrating an example of a provisioning and VLAN management call flow. The tenant account may be set up in MDU manager 846. A VLAN pool manager 954 may be notified of a potential new customer in operation 956 via a property setup API from MDU manager 846, and VLAN pool manager 954 may allocate an available VLAN to the account (operation 958). MDU manager 846 may issue a get command for the allocated VLAN (operation 960), and VLAN pool manager 954 may respond with VLAN identifier (operation 962). Moreover, AAA unit 840 may acquire the VLAN identifier from VLAN pool manager 954 on first connection of the tenant (operation 964 and 966). Thereafter, WAG 844 may be provisioned. Note that account details, MAP allowed CPEs, MAP allowed VLANs, CPE creation (1 per tunnel device) and VLAN settings application (IP, max clients, etc.) communications may be sent (see operations 968, 970, 972, 974 and 976) from MDU manager 846 to WAG 844. Consequently, the client may be provisioned on the network (operation 978).

Figure 10:
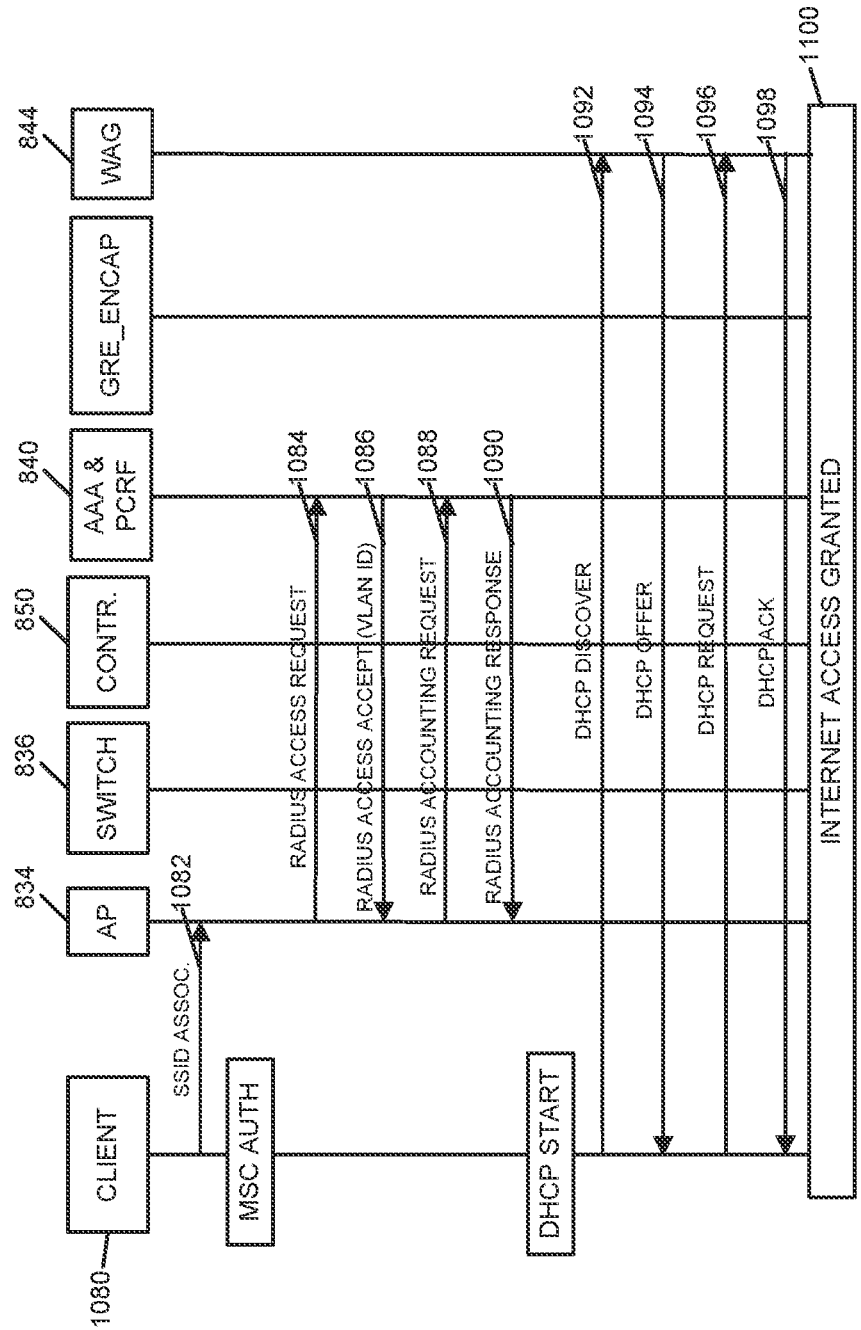
FIG. 10 is a flow diagram illustrating an example of onboarding known user electronic devices via an access point in accordance with an embodiment of the present disclosure.

FIG. 10 presents a flow diagram illustrating an example of onboarding known user electronic devices via access point 834. The user or tenant may connect an electronic device 1080 to access point 834 via SSID association (operation 1082). Then, access point 834 may send a MAB request to AAA unit 840 (operations 1084, 1086, 1088 and 1090). Moreover, client electronic device 1080 may gain Internet access 1100 over the MDU network by sending a Dynamic Host Configuration Protocol (DHCP) discover communication (operation 1092), receiving a DHCP offer (operation 1094) from WAG 844, requesting DHCP (operation 1096) from WAG 844, and receiving a DHCP acknowledgement (operation 1098) from the WAG 844.

Figure 11:
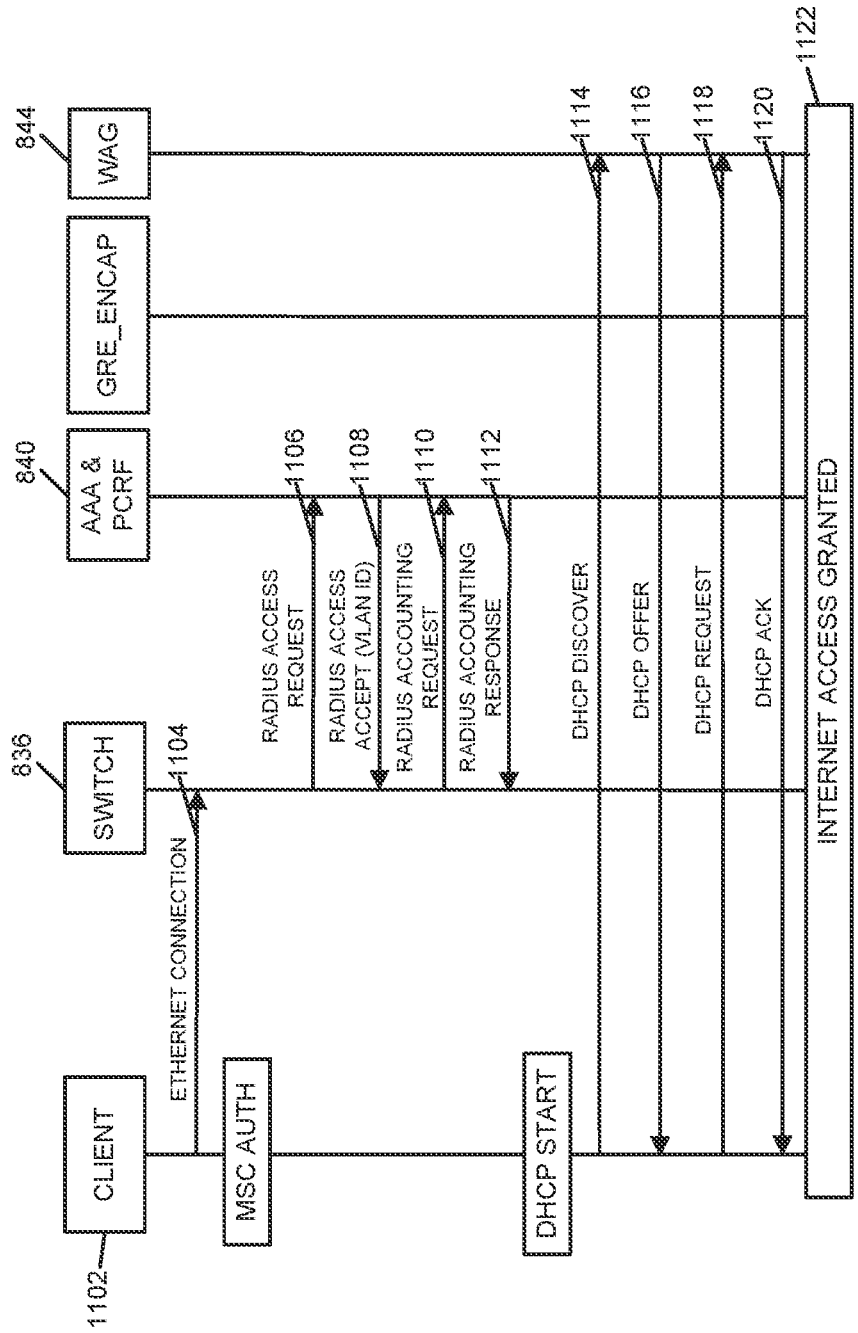
FIG. 11 is a flow diagram illustrating an example of onboarding a known user electronic device via a switch in accordance with an embodiment of the present disclosure.

FIG. 11 presents a flow diagram illustrating an example of onboarding a known user (client) electronic device via a switch 836 and an Ethernet connection. Here, the user may connect a client electronic device 1102 to switch 836 via an Ethernet connection (operation 1104), and switch 836 may send a MAB request to AAA unit 840 (operation 1106). Then, AAA unit 840 may return an assigned tenant VLAN to switch 836 (operation 1108). Moreover, switch 836 may communicates a master accounting request to AAA unit 840 (operation 1110) which may return a master accounting response to switch 836 (operation 1112). Next, client electronic device 1102 may gain Internet access 1122 over the network by sending a DHCP discover communication (operation 1114), receiving a DHCP offer (operation 1116) from WAG 844, requesting DHCP (operation 1118) from WAG 844, and receiving a DHCP acknowledgement (operation 1120) from WAG 844.

Note that a user or tenant may register or onboard an electronic device to their account by accessing a portal webpage or the like that automatically appears on the screen of an electronic device when an unauthenticated device attempts to connect to the MDU network. The user may already have an account or may create a new account to onboard a new electronic device and, therefore, may be able to access the Internet or other electronic devices connected to their PN. The portal may request the users email address or other username in combination with an associated password or the like. The portal may be configured to collect and verify new user information and may be configured to send a welcome email or other communication to the tenant. The user may use the portal to add and delete client electronic devices, modify account information, change a password, or the like. When adding a new electronic device, a description of the electronic device, a MAC address of the electronic device and/or an IMSI of the electronic device may be needed. This may be entered manually or may be detected automatically via DHCP, an application executing in the environment (e.g., operating system) of the electronic device or the like. The user may also use the portal to track client electronic device usage statistics or the like.

Moreover, a management portal may be provided to a property manager or owner. For example, the management portal may be for use by an individual that is responsible for assisting tenants to access the MDU network (such as adding users, deleting users, resetting a user password, onboard or removing user electronic devices). The management portal may also enable the manager to send email messages to one or more of the tenants. Session management may also be provided to enable a property manager to see all active and inactive sessions on the property and to remove any sessions. In addition, the management portal may be used to track, collect, and/or report network and/or infrastructure usage statistics.

Figure 12A:
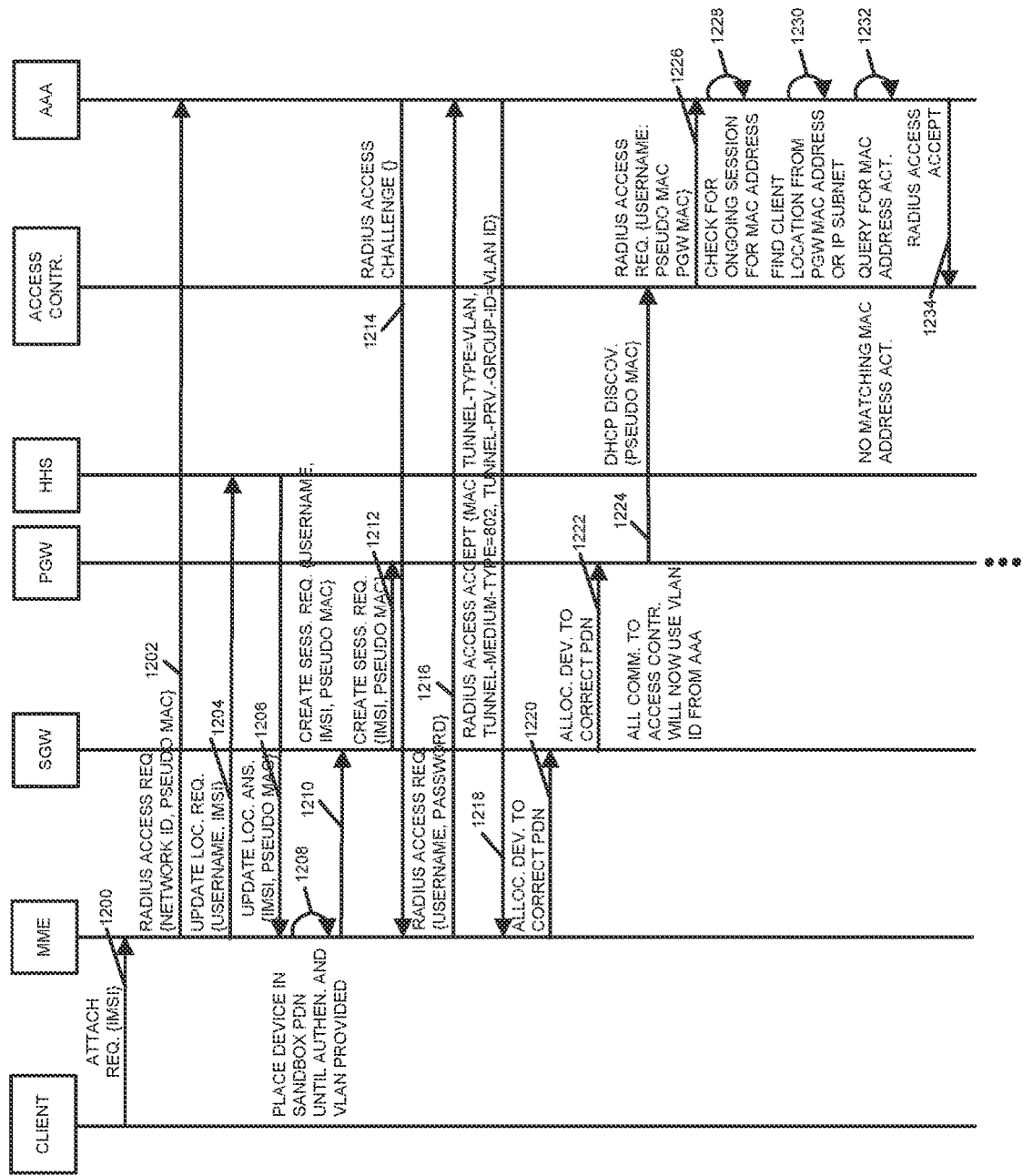
FIGS. 12A and 12B are a flow diagram illustrating an example of onboarding of an electronic device to a private network in accordance with an embodiment of the present disclosure.
Figure 12B:
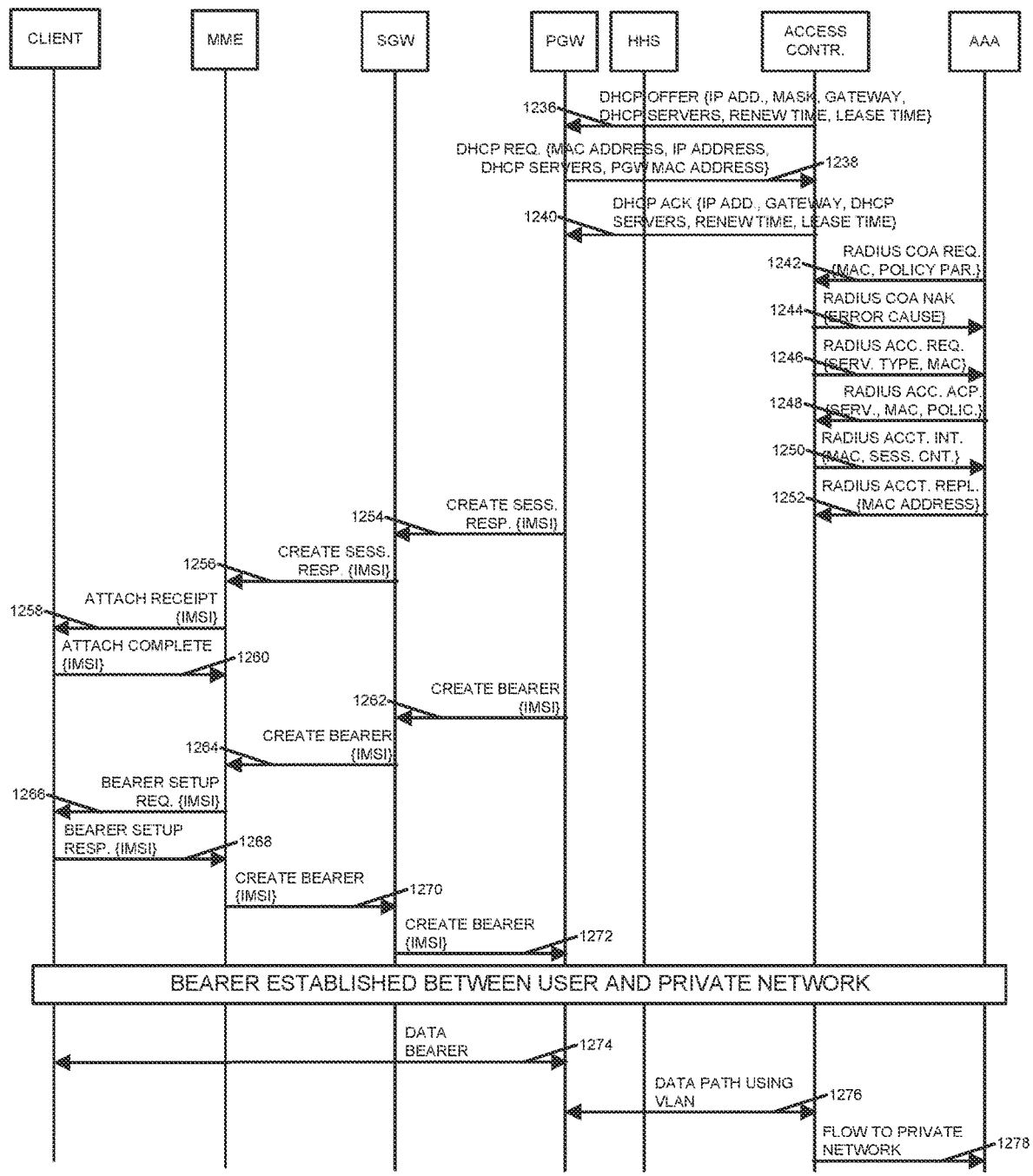

FIGS. 12A and 12B present a flow diagram illustrating an example of onboarding an electronic device to a private network. Notably, a client may be onboarded to a private network (operations 1200-1272) and then a flow to the private network may be established (operations 1274-1278).

We now describe embodiments of an electronic device, which may perform at least some of the operations in the communication techniques. FIG. 13 presents a block diagram illustrating an example of an electronic device 1300 in accordance with some embodiments, such as one of: base station 108, one of electronic devices 110, controller 112, one of access points 116, one of radio nodes 118, computer network device 128, computer 130 or computer 132. This electronic device includes processing subsystem 1310, memory subsystem 1312, and networking subsystem 1314. Processing subsystem 1310 includes one or more devices configured to perform computational operations. For example, processing subsystem 1310 can include one or more microprocessors, graphics processing units (GPUs), ASICs, microcontrollers, programmable-logic devices, and/or one or more digital signal processors (DSPs).

Memory subsystem 1312 includes one or more devices for storing data and/or instructions for processing subsystem 1310 and networking subsystem 1314. For example, memory subsystem 1312 can include DRAM, static random access memory (SRAM), and/or other types of memory. In some embodiments, instructions for processing subsystem 1310 in memory subsystem 1312 include: one or more program modules or sets of instructions (such as program instructions 1322 or operating system 1324, such as Linux, UNIX, Windows Server, or another customized and proprietary operating system), which may be executed by processing subsystem 1310. Note that the one or more computer programs, program modules or instructions may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316, an interface circuit 1318 and one or more antennas 1320 (or antenna elements). (While FIG. 13 includes one or more antennas 1320, in some embodiments electronic device 1300 includes one or more nodes, such as antenna nodes 1308, e.g., a metal pad or a connector, which can be coupled to the one or more antennas 1320, or nodes 1306, which can be coupled to a wired or optical connection or link. Thus, electronic device 1300 may or may not include the one or more antennas 1320. Note that the one or more nodes 1306 and/or antenna nodes 1308 may constitute input(s) to and/or output(s) from electronic device 1300.) For example, networking subsystem 1314 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 1300 may be adapted or changed using pattern shapers (such as directors or reflectors) and/or one or more antennas 1320 (or antenna elements), which can be independently and selectively electrically coupled to ground to steer the transmit antenna pattern in different directions. Thus, if one or more antennas 1320 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1300 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1300 may use the mechanisms in networking subsystem 1314 for performing simple wireless communication between the electronic devices, e.g., transmitting advertising or beacon frames and/or scanning for advertising frames transmitted by other electronic devices as described previously.

Within electronic device 1300, processing subsystem 1310, memory subsystem 1312, and networking subsystem 1314 are coupled together using bus 1328. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections among the subsystems.

In some embodiments, electronic device 1300 includes a display subsystem 1326 for displaying information on a display, which may include a display driver and the display, such as a liquid-crystal display, a multi-touch touchscreen, etc.

Moreover, electronic device 1300 may include a user-interface subsystem 1330, such as: a mouse, a keyboard, a trackpad, a stylus, a voice-recognition interface, and/or another human-machine interface. In some embodiments, user-interface subsystem 1330 may include or may interact with a touch-sensitive display in display subsystem 1326.

Electronic device 1300 can be (or can be included in) any electronic device with at least one network interface. For example, electronic device 1300 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 1300, in alternative embodiments, different components and/or subsystems may be present in electronic device 1300. For example, electronic device 1300 may include one or more additional processing subsystems, memory subsystems, networking subsystems, and/or display subsystems. Additionally, one or more of the subsystems may not be present in electronic device 1300. Moreover, in some embodiments, electronic device 1300 may include one or more additional subsystems that are not shown in FIG. 13. Also, although separate subsystems are shown in FIG. 13, in some embodiments some or all of a given subsystem or component can be integrated into one or more of the other subsystems or component(s) in electronic device 1300. For example, in some embodiments instructions 1322 is included in operating system 1324 and/or control logic 1316 is included in interface circuit 1318.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1314 and/or of electronic device 1300. The integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1322, operating system 1324 (such as a driver for interface circuit 1318) or in firmware in interface circuit 1318. Alternatively or additionally, at least some of the operations in the communication techniques may be implemented in a physical layer, such as hardware in interface circuit 1318.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
    an interface circuit configured to communicate with a second computer, wherein the computer is configured to perform operations comprising:
        providing, addressed to the second computer, information that specifies a mapping of an identifier of an electronic device in a wireless network and a second identifier of a virtual container for traffic associated with the electronic device in the wireless network to a third identifier of the electronic device in a cellular-telephone network, wherein the electronic device and the virtual container are associated with an entity.

2. The computer of claim 1, wherein the operations comprise communicating the traffic between the wireless network and the cellular-telephone network within the virtual container based at least in part on the mapping; and
    wherein the virtual container isolates the traffic from other traffic in the wireless network.

3. The computer of claim 2, wherein the operations comprise providing a packet addressed the second computer; and
    wherein the packet comprises the identifier and the second identifier.

4. The computer of claim 2, wherein the operations comprise receiving a packet associated with the second computer; and
    wherein the packet comprises the identifier and the second identifier.

5. The computer of claim 1, wherein the computer comprises a gateway for the wireless network and the second computer comprises a packet gateway for the cellular-telephone network.

6. The computer of claim 1, wherein the computer comprises a controller of computer network devices in the wireless network.

7. The computer of claim 1, wherein the wireless network comprises a wireless local area network (WLAN) that is compatible with an Institute of Electrical and Electronics Engineers (IEEE) 802.11 communication protocol, and the cellular-telephone network is compatible with a cellular data communication protocol.

8. The computer of claim 1, wherein the wireless network and the cellular-telephone network are associated with a private entity.

9. The computer of claim 1, wherein the identifier comprises a media access control (MAC) address and the third identifier comprises an international mobile subscriber identity (IMSI).

10. The computer of claim 1, wherein the second computer is associated with an evolved packet core (EPC) of the cellular-telephone network.

11. The computer of claim 1, wherein the virtual container comprises a virtual local area network (VLAN).

12. The computer of claim 1, wherein the mapping comprises layer 2 information.

13. The computer of claim 1, wherein the information specifies the mapping of instances of the identifier and instances of the second identifier for a set of electronic devices to the third identifier; and wherein the virtual container permits intercommunication among the set of electronic devices in the wireless network, the cellular-telephone network or both.

14. The computer of claim 1, wherein the operations comprise providing information specifying instances of the mapping for the multiple entities; and wherein a given entity is associated with a given virtual container.

15. A non-transitory computer-readable storage medium for use in conjunction with a computer, the computer-readable storage medium storing program instructions that, when executed by the computer, cause the computer to perform operations comprising:

providing, addressed to a second computer, information that specifies a mapping of an identifier of an electronic device in a wireless network and a second identifier of a virtual container for traffic associated with the electronic device in the wireless network to a third identifier of the electronic device in a cellular-telephone network, wherein the electronic device and the virtual container are associated with an entity; and communicating the traffic between the wireless network and the cellular-telephone network within the virtual container based at least in part on the mapping, wherein the virtual container isolates the traffic from other traffic in the wireless network.

16. The non-transitory computer-readable storage medium of claim 15, wherein the identifier comprises a media access control (MAC) address and the third identifier comprises an international mobile subscriber identity (IMSI).

17. The non-transitory computer-readable storage medium of claim 15, wherein the mapping comprises layer 2 information.

18. A method for segmenting traffic associated with different entities across heterogeneous networks, comprising:

by a computer:

providing, addressed to a second computer, information that specifies a mapping of an identifier of an electronic device in a wireless network and a second identifier of a virtual container for traffic associated with the electronic device in the wireless network to a third identifier of the electronic device in a cellular-telephone network, wherein the electronic device and the virtual container are associated with an entity; and communicating the traffic between the wireless network and the cellular-telephone network within the virtual container based at least in part on the mapping, wherein the virtual container isolates the traffic from other traffic in the wireless network.

19. The method of claim 18, wherein the identifier comprises a media access control (MAC) address and the third identifier comprises an international mobile subscriber identity (IMSI).

20. The method of claim 18, wherein the mapping comprises layer 2 information.

* * * * *